April 12, 1966     W. B. LEWIS     3,246,153
CALORIMETER CAPABLE OF SEPARATELY DETERMINING NEUTRON
ENERGY ABSORPTION AND GAMMA ENERGY ABSORPTION
Filed Aug. 14, 1963
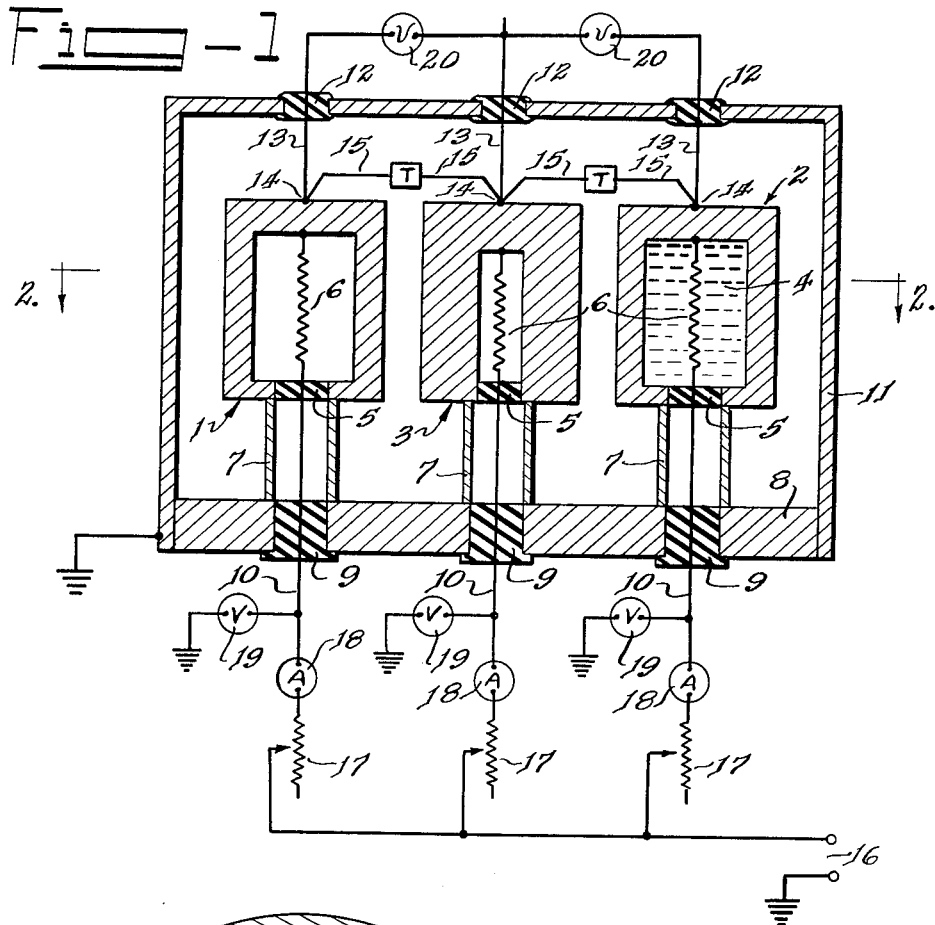
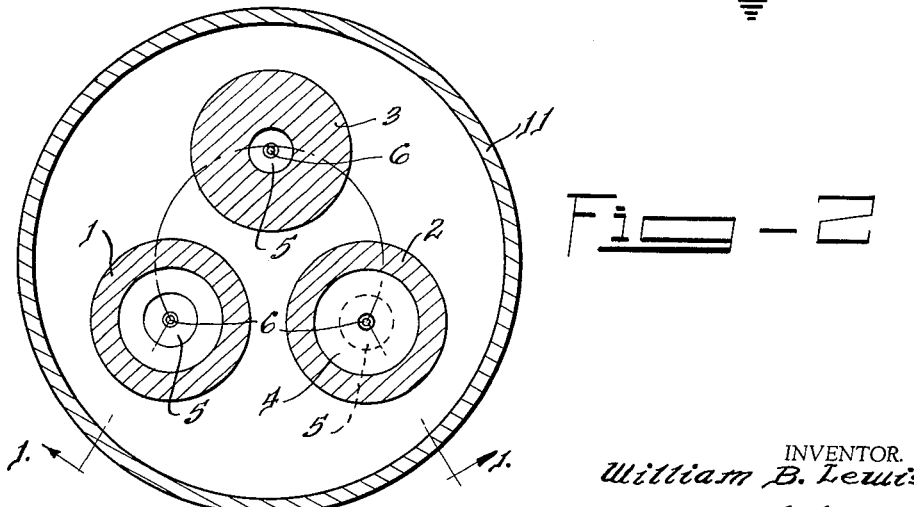
INVENTOR.
William B. Lewis
BY Roland G. Anderson
Attorney

United States Patent Office 3,246,153
Patented Apr. 12, 1966

3,246,153
CALORIMETER CAPABLE OF SEPARATELY DE-
TERMINING NEUTRON ENERGY ABSORPTION
AND GAMMA ENERGY ABSORPTION
William B. Lewis, Idaho Falls, Idaho, assignor to the
United States of America as represented by the United
States Atomic Energy Commission
Filed Aug. 14, 1963, Ser. No. 302,219
4 Claims. (Cl. 250—83.3)

The invention described herein was made in the course of, or under, a contract with the United States Atomic Energy Commission.

The present invention relates to an instrument for determining the amount of energy originating in gamma attenuation when a substance is subjected to an environment of both neutrons and gamma radiation, where each type of radiation may extend over a wide energy spectrum.

Radiation damage may differ both in degree and kind in substances used or proposed for use as a moderator or coolant in a nuclear reactor. This is particularly important in nuclear reactors utilizing organic coolants such as polyphenyls. The ratio of gamma radiation to neutrons varies widely over the life of a set of fuel elements as well as over a power cycle.

There is additional need for an instrument of this type in studying and optimizing conditions for radiation induced reactions, such as the conversion of ammonia to hydrazine. The neutron effect differs substantially from the gamma effect, so it is important to know the absorption of each, again over a wide energy spectrum.

Since the energy absorbed in any substance is converted to heat energy, a calorimeter is a logical instrument for determining *total* radiation energy absorbed. Calorimeters are commonly used for this purpose. However, the ordinary calorimeter is unable to distinguish between the different sources of heat.

The present invention consists of three calorimeters in the same instrument, differing in mass and/or material, with individual electrical heating means to bring the total energy input to each calorimeter to an equal measure. The substance of interest is one of the materials of one of the calorimeters. A system of simultaneous equations then allows the energy absorbed from neutrons and gammas to be determined separately.

The invention is best described by reference to the drawings, wherein FIGURE 1 is a semi-schematic cross-sectional view of the instrument taken along lines 1—1 of FIGURE 2, and FIGURE 2 is a cross-sectional view taken along lines 2—2 of FIGURE 1.

Referring to FIGURES 1 and 2, first cylindrical body 1 is a hollow cylinder of magnesium, second cylindrical body 2 is another hollow cylinder of magnesium identical in dimensions with body 1, while the third cylindrical body 3, again a hollow magnesium cylinder, has substantially thicker walls. A body 4 of the substance under investigation (diphenyl in our example) is inserted into the cavity of cylindrical body 2. Each of the cylindrical bodies, 1, 2 and 3 have an opening at the bottom into which an insulating plug 5 is inserted. A resistance coil 6 passes through each insulating plug 5, and is connected to the upper wall of cylindrical bodies 1, 2 and 3.

Each of the cylindrical bodies 1, 2 and 3 is positioned coaxially upon and is in thermal contact with a pedestal 7 in the form of a thin walled cylinder of magnesium. Pedestals 7 in turn are positioned upon and are in thermal contact with base plate 8, also made of magnesium.

Base plate 8 has three insulators 9 passing therethrough in a position coaxial with each pedestal 7. Through each insulator 9 passes a lead wire 10, connected to each of the coils 6.

Housing 11 is an open ended cylinder of magnesium closely fitting base plate 8. Three insulating plugs 12 pass through the top of housing 11 in a position collinear with the axes of cylindrical bodies 1, 2 and 3. Single first thermocouple lead wires 13 pass through each of the insulating plugs 12 and connect to thermocouples 14, positioned identically in each of the cylindrical bodies 1, 2 and 3 and in thermal contact therewith. The second thermocouple leads 15 are connected together from thermocouples 14 inserted into cylindrical bodies 1 and 3, and are similarly connected between bodies 2 and 3. Voltmeters 20 adapted to determine a null voltage, and therewith equality of temperature, are connected between thermocouple lead wires 13, as shown.

An electrical power supply 16 is connected to each of the lead wires 10 to the resistance coils 6, through rheostats 17 and ammeters 18. The circuit to each of the coils 6 also has a voltmeter 19, so that by simultaneously reading each ammeter 18 and voltmeter 19, the electrical wattage supplied can be determined. It is convenient to allow one leg of each circuit to be grounded as shown.

It will be noted that the bodies 1, 2 and 3 are all symmetrically positioned relative to each other and to base plate 8 and housing 11 and that their heat conductive paths to ground are all identical. Therefore each body tends to lose heat to its environment at the same rate as the others.

A particular embodiment of convenient size and characteristics has the following parameters.

TABLE I

| Cylindrical Body No. | 1 | 2 | 3 |
|---|---|---|---|
| Mass of magnesium, $m_1$ (gm.) [1] | 13.41 | 13.33 | 36.44 |
| Mass of diphenyl, $m_2$ (gm.) | 0 | 12.44 | 0 |
| Heat capacity (joules $F^{-1}$) | 7.65 | 15.0 | 20.8 |
| Diameter of cylinder (in.) | 0.80 | 0.80 | 0.80 |
| Length of cylinder (in.) | 2.50 | 2.50 | 2.50 |
| Diameter of pedestal (in.) | 0.29 | 0.29 | 0.29 |
| Length of pedestal (in.) | 1.50 | 1.50 | 1.50 |
| Wall thickness of pedestal (in.) | 0.015 | 0.015 | 0.015 |
| Thermal conductance of pedestal (watts $F^{-1}$) | 0.01 | 0.01 | 0.01 |
| Thermal resistance of pedestal (° F. watt$^{-1}$) | 100 | 100 | 100 |

[1] Heater wire and insulating plug are included in magnesium weight.

TABLE II

*Temperature measuring circuit characteristics*

Sensitivity _____ 0.7 $\mu$v./division.
Thermocouple constant _____ 30 $\mu$v./° F.
Minimum drift rate _____ $\sim 10^{-2}$ divisions/sec.

When two bodies with different absorptive characteristics are placed in a radiation field, different amounts of energy are absorbed. We designate the gamma-induced and neutron-induced energy per mass unit of material $j$ as $g_j$ and $n_j$. Obviously, two materials must be included to uniquely determine these quantities. Then the calorimeter must have three units. The materials must be so chosen that their interactions with one of the types of radiation differ.

It is preferable that the interaction of one material be very small with the type of radiation where the characteristics differ. Since one of the types of radiation of interest is neutrons, one of the materials should have moderating properties substantially differing from the other.

Using the above nomenclature let $x_j = g_j + n_j$ where $x_j$ is the total amount of energy absorbed from both neutrons and gamma radiation.

Then if W is the total power in any unit calorimeter $$W = m_1 x_1 + m_2 x_2 + w = \frac{C}{r}$$

where $m_1$ is the mass of the first material, in our case the magnesium metal, $m_2$ is the mass of the moderating material, $w$ is the electrical power supplied, and $r$ is the thermal resistance of all leakage paths from the unit. When all unit calorimeters are at the same temperature, C is a constant. When the calorimeter unit contains no second material obviously the term $m_2 x_2$ vanishes.

The formula can be recast into $$r_k(m_{1,k}x_1 + m_{2,k}x_2 + w_k) = C \quad k=1, 2, 3$$

where $k$ represents each unit calorimeter in turn. Since, at equal temperatures, C becomes constant we can combine the three equations to obtain two with only $x_j$ unknown.

We get $$\left(\frac{r_1}{r_3}m_{1,1} - m_{1,3}\right)x_1 + \left(\frac{r_1}{r_3}m_{2,1} - m_{2,3}\right)x_2 = w_3 - \frac{r_1}{r_3}w_1$$

and $$\left(\frac{r_2}{r_3}m_{1,2} - m_{1,3}\right)x_1 + \left(\frac{r_2}{r_3}m_{2,2} - m_{2,3}\right)x_2 = w_3 - \frac{r_2}{r_3}w_2$$

where the final subscript shows the calorimeter number designated.

For the instrument of the embodiment shown, where heat conductances are equal and only calorimeter 2 contains the second material, the equations can be simplified. Since the calorimeter containing moderator absorbs the most energy from radiation, we can supply electrical heat to the other two calorimeters only, further simplifying the equations. The numbers of the calorimeters are the same as shown in FIGURES 1 and 2.

We obtain thereby $$(m_{1,1} - m_{1,3})x_1 = w_3 - w_1$$

and $$(m_{1,2} - m_{1,3})x_1 + m_{2,2}x_2 = w_3$$

substituting the weights of metal for the $m_{1,j}$ and the electrical heat energy supplied for the $w_k$, we can solve directly for $x_1$ and $x_2$.

EXAMPLE

The multiple calorimeter of the embodiment described earlier is exposed to radiation containing gamma radiations and neutrons from a reactor. Both gamma radiation and neutrons have energies over a wide spectrum. Electrical heat is supplied to unit calorimeters 1 and 3 and varied until a steady state and identical temperatures are obtained. It is found that the electrical energy supplied to calorimeter 1 is 16.407 watts; to calorimeter 3, 3.732 watts.

Using the weights of Table I and the simplified formulas, we obtain $$(13.41 - 36.44)x_1 = 3.732 - 16.407 \text{ or } 23.03x_1 = 12.675$$

$$x_1 = 0.55 \text{ watt/gm. (magnesium)}$$

and $$(13.33 - 36.44)x_1 + 12.44x_2 = 3.732$$

$$12.44x_2 - (23.11 \times 0.55) = 3.732$$

$$12.44x_2 = 12.710 + 3.732 = 16.442$$

$$x_2 = 1.32 \text{ watts/gm. (diphenyl)}$$

Since magnesium has an extremely low cross section for neutrons and is a very poor moderator, we can assign zero to its energy absorption from neutrons. From previous experimental results we know that magnesium and diphenyl absorb energy from gammas substantially equally over the entire energy spectrum on a mass basis.

Returning to the original formula, substituting subscript 1 for magnesium and 2 for diphenyl in $x_j = g_j + n_j$ we get $x_1 = g_1 + n_1$ and $x_2 = g_2 + n_2$ substituting $$0.55 = g_1 + 0 \quad g_1 = 0.55 \text{ watt/gm.}$$

and $$1.32 = g_2 + n_2 = 0.55 + n_2$$

$$n_2 = 1.32 - 0.55 = 0.77 \text{ watt/gm.}$$

Thus we have shown that in the particular combined gamma neutron field, the diphenyl sample material absorbs 0.55 watt/gm. from the gamma radiation and 0.77 watt/gm. from the neutron radiation.

The invention is clearly not limited to the particular instrument or the materials shown in the specific embodiment shown. Limits of the invention are to be only those limits defined by the appended claims.

What is claimed is:

1. A calorimetric device for differentiating between the gamma and neutron effects in a combined radiation field, comprising three bodies of identical outer dimension arranged symmetrically with respect to each other, a common heat sink for said bodies arranged symmetrically therewith, three identical means for conducting heat from said three bodies to said heat sink, the first and second of said bodies being formed wholly of a first material having a substantially zero characteristic power absorption per unit mass for neutron radiation, the third of said bodies being formed of said first material and a second material having a substantial characteristic power absorption per unit mass for neutron irradiation and a characteristic power absorption per unit mass for gamma radiation substantially equal to that of said first material, each of said bodies differing from the other in total mass, three individual electrical means for introducing electrical power into said respective bodies, means for individually measuring the electrical power, means for indicating a temperature difference between said bodies, and means for individually adjusting the electric power until the temperature of the three bodies are equal.

2. The device of claim 1 in which the three bodies are hollow cylinders of magnesium, the first and second of said bodies differing in wall thickness, and the third of said bodies containing the second material in the cavity enclosed therein.

3. The device of claim 2 where the axes of the cylinder are in parallel position and spaced equally around a circle, and enclosed in a housing.

4. The device of claim 2 wherein said first material is magnesium and said second material is a liquid moderator.

References Cited by the Examiner

UNITED STATES PATENTS

| | | | |
|---|---|---|---|
| 2,785,314 | 3/1957 | Graham | 250—71.5 |
| 3,033,985 | 5/1962 | Petree | 250—83.3 |
| 3,080,480 | 5/1963 | Scherbatskoy | 250—83.3 |
| 3,096,440 | 7/1963 | Gamble | 250—83.3 |

RALPH G. NILSON, *Primary Examiner.*

J. W. LAWRENCE, *Assistant Examiner.*